(12) United States Patent
Mate et al.

(10) Patent No.: US 9,363,488 B2
(45) Date of Patent: Jun. 7, 2016

(54) METHODS, APPARATUSES AND COMPUTER PROGRAM PRODUCTS FOR ANALYZING CROWD SOURCE SENSED DATA TO DETERMINE INFORMATION RELATED TO MEDIA CONTENT OF MEDIA CAPTURING DEVICES

(75) Inventors: Sujeet Shyamsundar Mate, Tampere (FI); Igor Danilo Diego Curcio, Tampere (FI); Francesco Cricri, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 908 days.

(21) Appl. No.: 13/345,143

(22) Filed: Jan. 6, 2012

(65) Prior Publication Data
US 2013/0176438 A1 Jul. 11, 2013

(51) Int. Cl.
*H04N 7/18* (2006.01)
*H04N 21/218* (2011.01)
*H04N 21/234* (2011.01)
*H04N 21/845* (2011.01)

(52) U.S. Cl.
CPC ............... *H04N 7/181* (2013.01); *H04N 7/185* (2013.01); *H04N 21/21805* (2013.01); *H04N 21/23412* (2013.01); *H04N 21/23418* (2013.01); *H04N 21/845* (2013.01)

(58) Field of Classification Search
CPC ..................... H04N 21/23418; H04N 21/845
See application file for complete search history.

(56) References Cited

U.S. PATENT DOCUMENTS

2010/0026809 A1* 2/2010 Curry .................... H04N 5/222
348/157

* cited by examiner

*Primary Examiner* — Andy Rao
*Assistant Examiner* — Tyler Edwards
(74) *Attorney, Agent, or Firm* — Alston & Bird LLP

(57) ABSTRACT

An apparatus for classifying focus points detected in media content associated with an event(s) and generating a media content recording with media segments associated with a portion of the focus points may include a processor and memory storing executable computer program code that cause the apparatus to at least perform operations including receiving items of recorded media content and sensor data, from one or more devices, corresponding to at least one event. The computer program code may further cause the apparatus to determine one or more focus points of interest in the media content indicating areas or locations of interest that are associated with the event. The computer program code may further cause the apparatus to classify the focus points of interest based in part on analyzing respective items of the sensor data. Corresponding methods and computer program products are also provided.

18 Claims, 9 Drawing Sheets

METHODS, APPARATUSES AND COMPUTER PROGRAM PRODUCTS FOR ANALYZING CROWD SOURCE SENSED DATA TO DETERMINE INFORMATION RELATED TO MEDIA CONTENT OF MEDIA CAPTURING DEVICES

TECHNOLOGICAL FIELD

An example embodiment of the present invention relates generally to media content recording and, more particularly, relate to a method, apparatus, and computer program product for utilizing crowd source sensed context data associated with one or more events to determine data of interest in media content related to the events.

BACKGROUND

Various image capturing devices have become prevalent in recent years as a variety of mobile devices, such as cellular telephones, video recorders or the like, having cameras or other image capturing devices have multiplied. As such, it has become common for a plurality of people who are attending the same event to separately capture video of the event. For example, multiple people at a sporting event, a concert, a theater performance or the like may capture video of the performers. Although each of these people may capture video of the same event, the video captured by each person may be somewhat different. For instance, the video captured by each person may be from a different angle or perspective and/or from a different distance relative to the playing field, the stage, or the like. Additionally or alternatively, the video captured by each person may focus upon different performers or different combinations of the performers.

In order to provide a more fulsome video of an event, it may be desirable to mix the videos captured by different people. However, efforts to mix the videos captured by a number of different people of the same event have proven to be challenging, particularly in instances in which the people who are capturing the video are unconstrained in regards to their relative position to the performers and in regards to the performers who are in the field of view of the videos.

BRIEF SUMMARY

A method, apparatus and computer program product are therefore provided according to an example embodiment of the present invention to analyze different aspects of an event (e.g., a public event) captured by a plurality of media capturing devices (e.g., a camera, video recorder and/or the like) to utilize crowd source sensing to analyze the captured media content of users at the event(s) and sensor data (e.g., location information, orientation information and position information of a media capturing device, etc.) associated with the media content.

In this regard, an example embodiment may utilize crowd sourced sensing to determine one or more focus points of interest in which a number of users point media capturing devices at areas of interest associated with the event(s) to capture the media content. In addition, an example embodiment may classify the focus points and may utilize the classification of the focus points to determine semantic information about the recording behavior of the users at the event(s). In this regard, the crowd sourced sensing may be achieved by detecting information of sensors available on a communication device (e.g., a mobile device(s)) or on dedicated recording devices employed by the users to perform the recording of the media content (e.g., videos and/or pictures or other media (e.g., three-dimensional (3D) video, 3D audio or the like)).

Additionally, an example embodiment may generate one or more media content recordings (e.g., a video remix, a video summary, etc.) of an event(s) (e.g., a sports event, musical event, theatrical event, etc.) based in part on the interestingness of media segments associated with at least a portion of the focus points. For instance, the media segments associated with these focus points may be prioritized, combined and included in the generated media content recording.

In one example embodiment, a method for classifying focus points detected in media content associated with an event(s) is provided. The method may include receiving a plurality of items of recorded media content and sensor data from one or more devices. The items of recorded media content and sensor data correspond to at least one event. The method may further include determining one or more focus points of interest in the media content indicating areas or locations of interest that are associated with the event. The method may further include classifying the focus points of interest based in part on analyzing respective items of the sensor data.

In another example embodiment, an apparatus for classifying focus points detected in media content associated with an event(s) is provided. The apparatus may include a processor and memory including computer program code. The memory and the computer program code are configured to, with the processor, cause the apparatus to at least perform operations including receiving a plurality of items of recorded media content and sensor data from one or more devices. The items of recorded media content and sensor data correspond to at least one event. The memory and computer program code are also configured to, with the processor, cause the apparatus to determine one or more focus points of interest in the media content indicating areas or locations of interest that are associated with the event. The memory and computer program code are also configured to, with the processor, cause the apparatus to classify the focus points of interest based in part on analyzing respective items of the sensor data.

In another example embodiment, a computer program product for classifying focus points detected in media content associated with an event(s) is provided. The computer program product includes at least one computer-readable storage medium having computer-executable program code portions stored therein. The computer-executable program code instructions may include program code instructions configured to cause receipt of a plurality of items of recorded media content and sensor data from one or more devices. The items of recorded media content and sensor data correspond to at least one event. The program code instructions may also be configured to determine one or more focus points of interest in the media content indicating areas or locations of interest that are associated with the event. The program code instructions may also be configured to classify the focus points of interest based in part on analyzing respective items of the sensor data.

In another example embodiment, a method for classifying focus points detected in media content associated with an event(s) is provided. The method may include recording one or more items of media content associated with an event and detecting sensor data associated with the recorded media content. The method may further include enabling provision of the recorded media content and the sensor data to a device to enable the device to determine one or more focus points of interest in the media content. The focus points indicate areas or locations of interest that are associated with the event. The provision of the recorded media content and the sensor data to the device enables the device to classify the focus points of interest based in part on analyzing respective items of the sensor data.

In another example embodiment, an apparatus for classifying focus points detected in media content associated with an event(s) is provided. The apparatus may include a processor and memory including computer program code. The memory and the computer program code are configured to, with the processor, cause the apparatus to at least perform operations including recording one or more items of media content associated with an event and detecting sensor data associated with the recorded media content. The memory and computer program code are also configured to, with the processor, cause the apparatus to enable provision of the recorded media content and the sensor data to a device to enable the device to determine one or more focus points of interest in the media content. The focus points indicate areas or locations of interest that are associated with the event. The provision of the recorded media content and the sensor data to the device enables the device to classify the focus points of interest based in part on analyzing respective items of the sensor data.

In another example embodiment, a computer program product for classifying focus points detected in media content associated with an event(s) is provided. The computer program product includes at least one computer-readable storage medium having computer-executable program code portions stored therein. The computer-executable program code instructions may include program code instructions configured to facilitate recording of one or more items of media content associated with an event and detect sensor data associated with the recorded media content. The program code instructions may also be configured to enable provision of the recorded media content and the sensor data to a device to enable the device to determine one or more focus points of interest in the media content. The focus points indicate areas or locations of interest that are associated with the event. The provision of the recorded media content and the sensor data to the device enables the device to classify the focus points of interest based in part on analyzing respective items of the sensor data.

BRIEF DESCRIPTION OF THE SEVERAL VIEWS OF THE DRAWINGS

Figure 1:
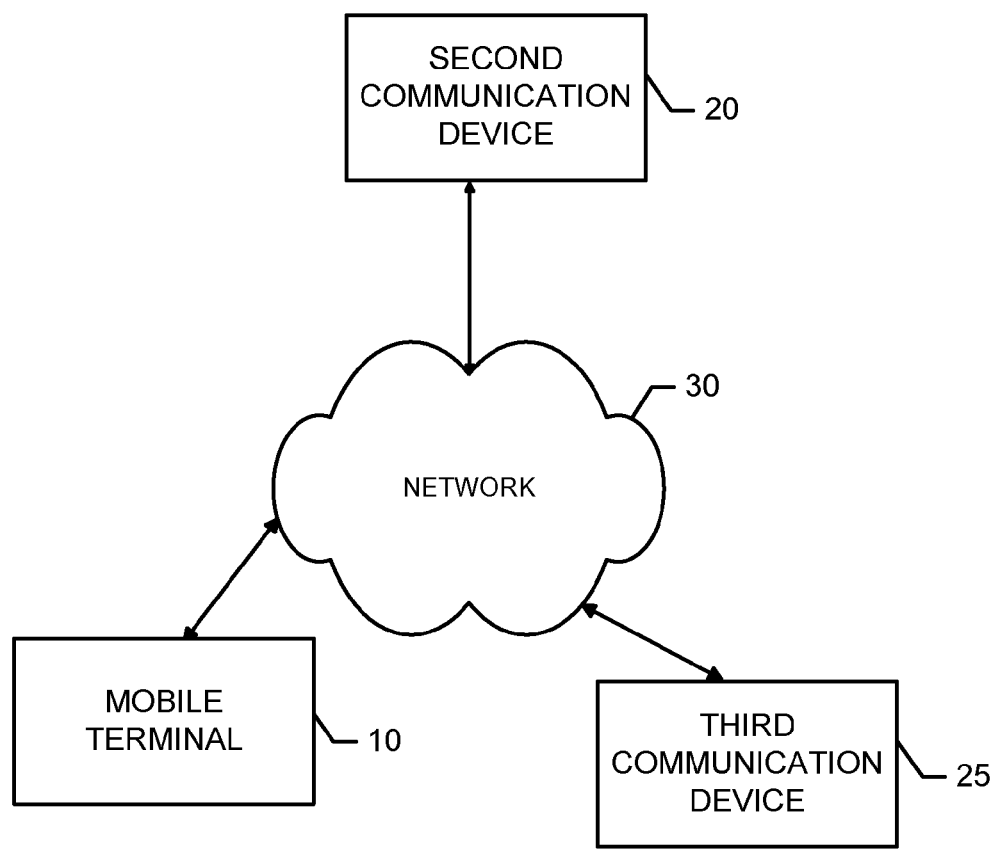
Figure 2:
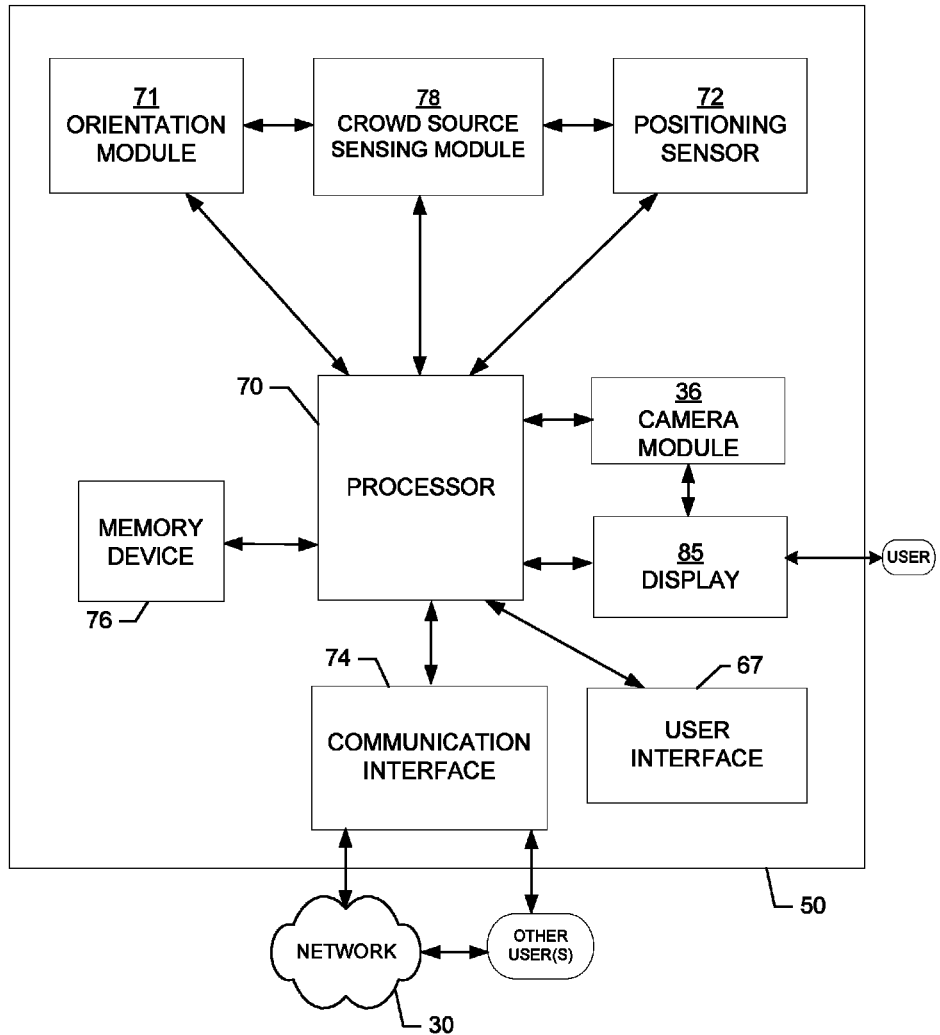
Figure 3:
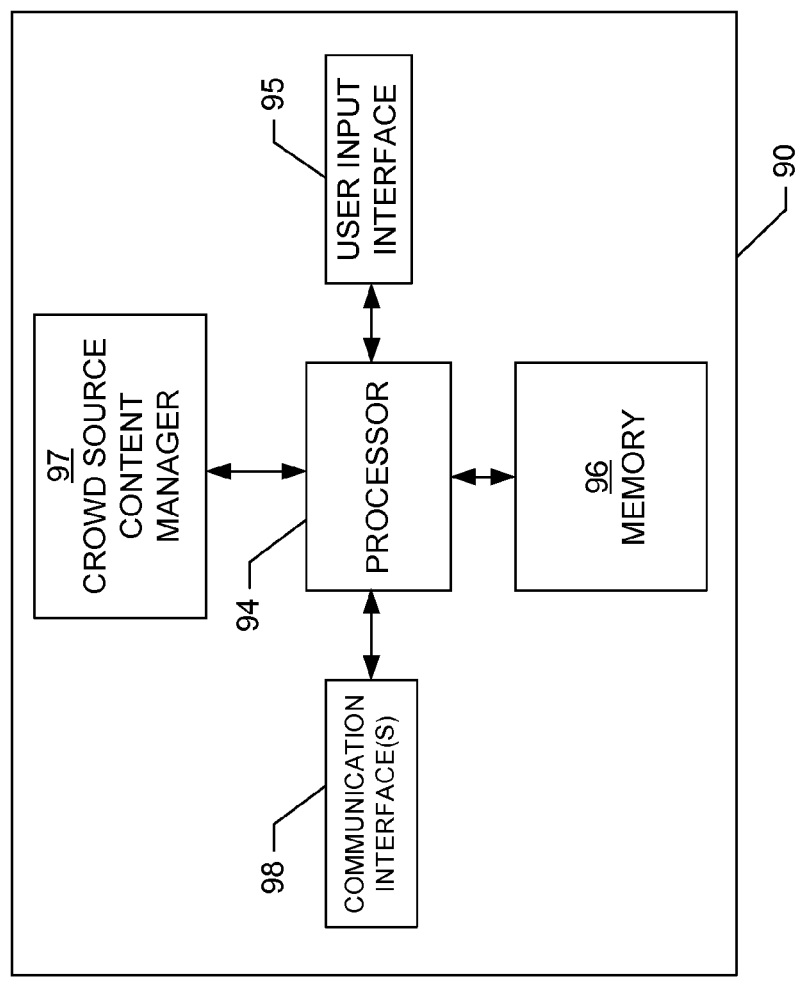
Figure 4:
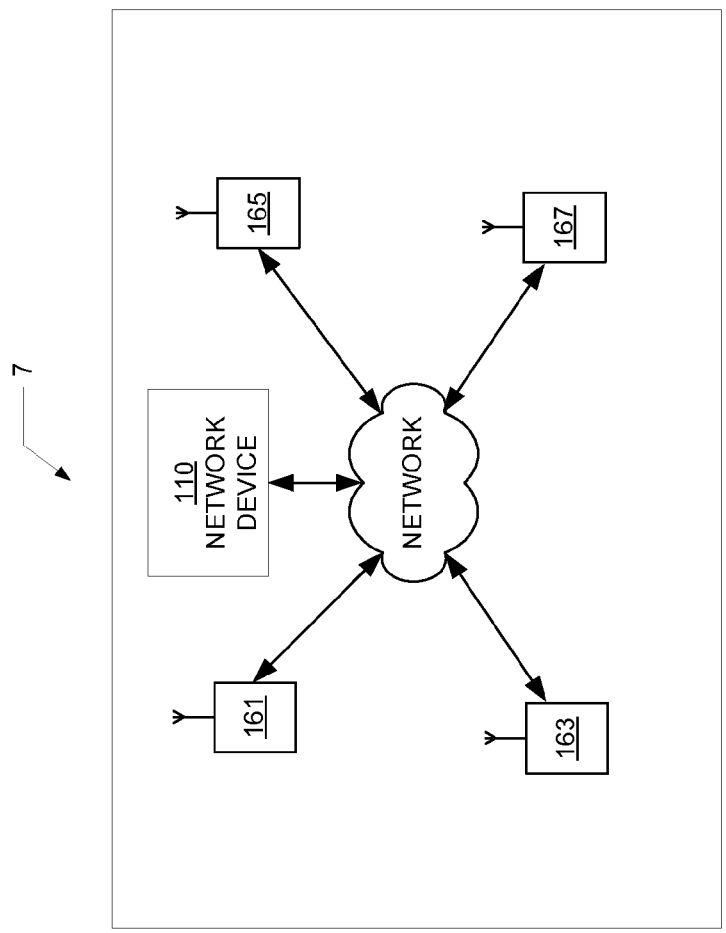
Figure 5:
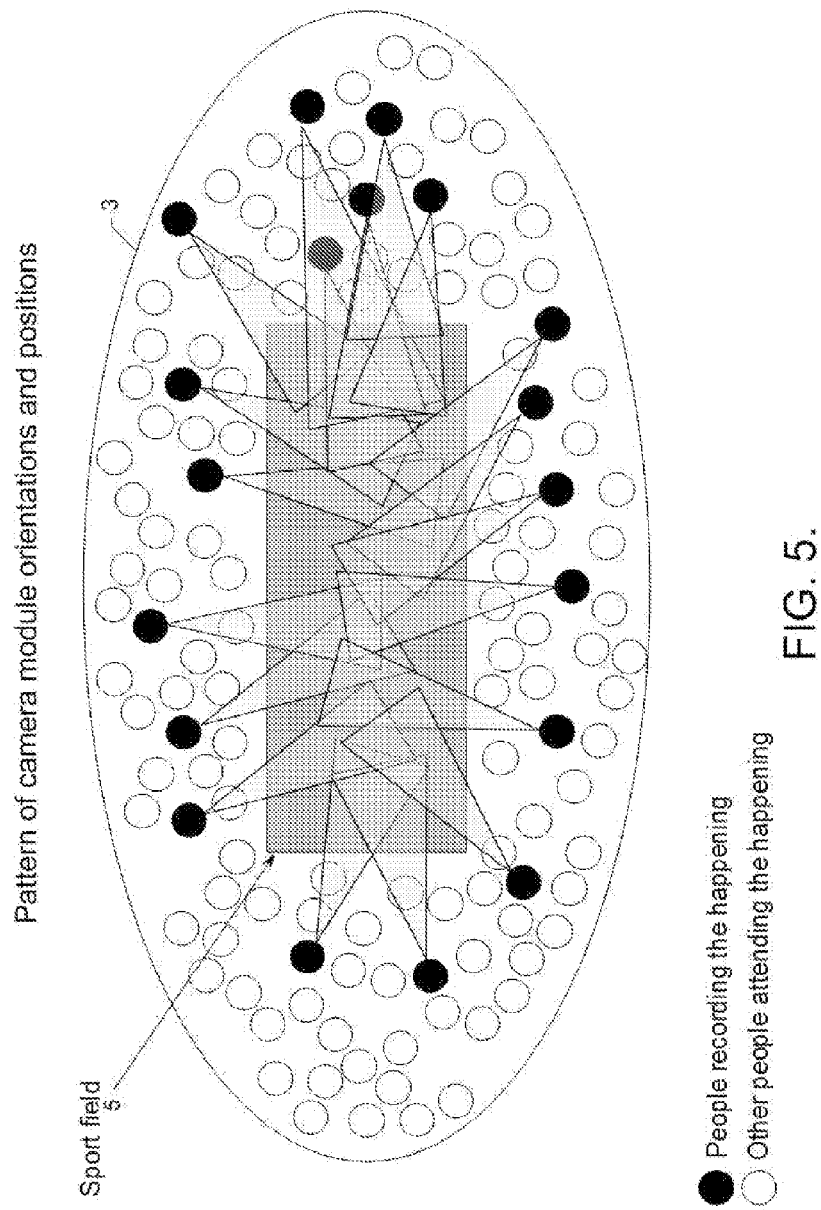
Figure 6:
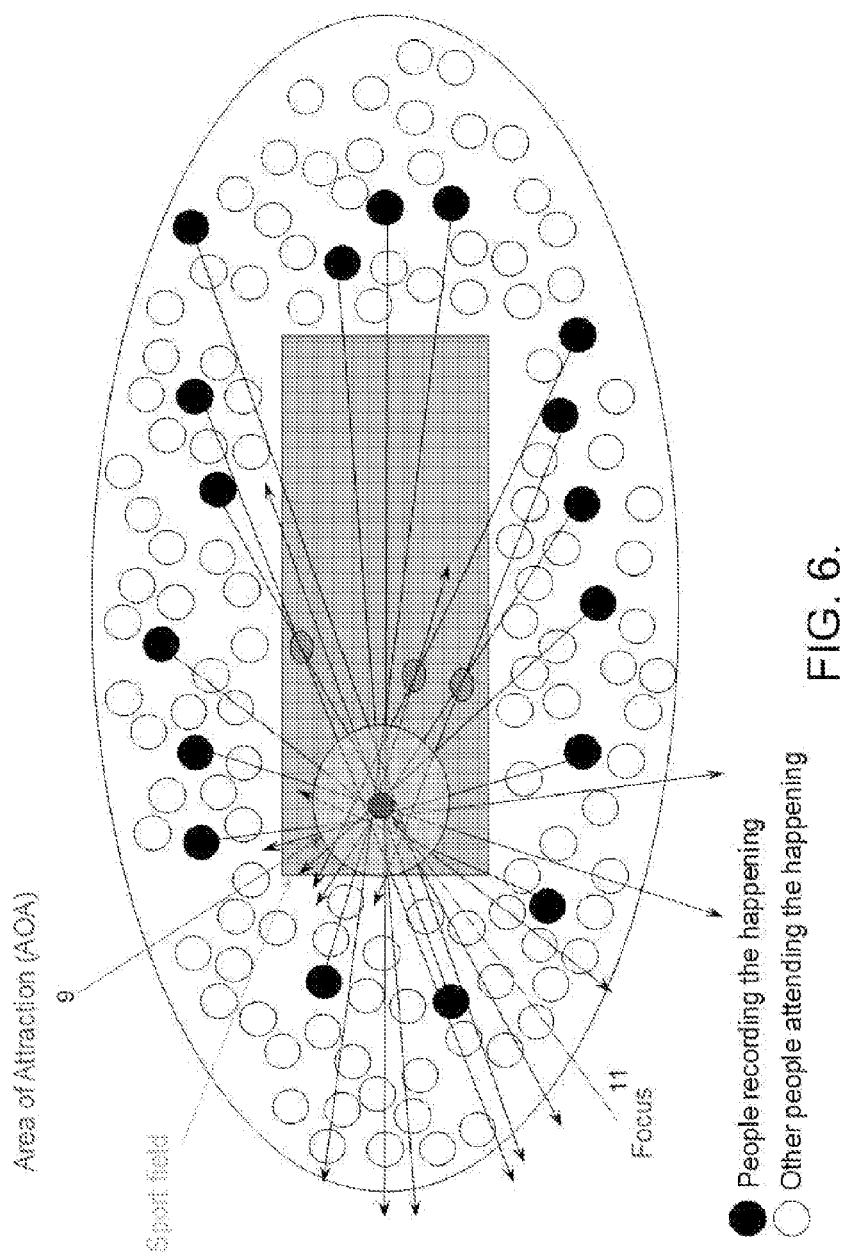
Figure 7:
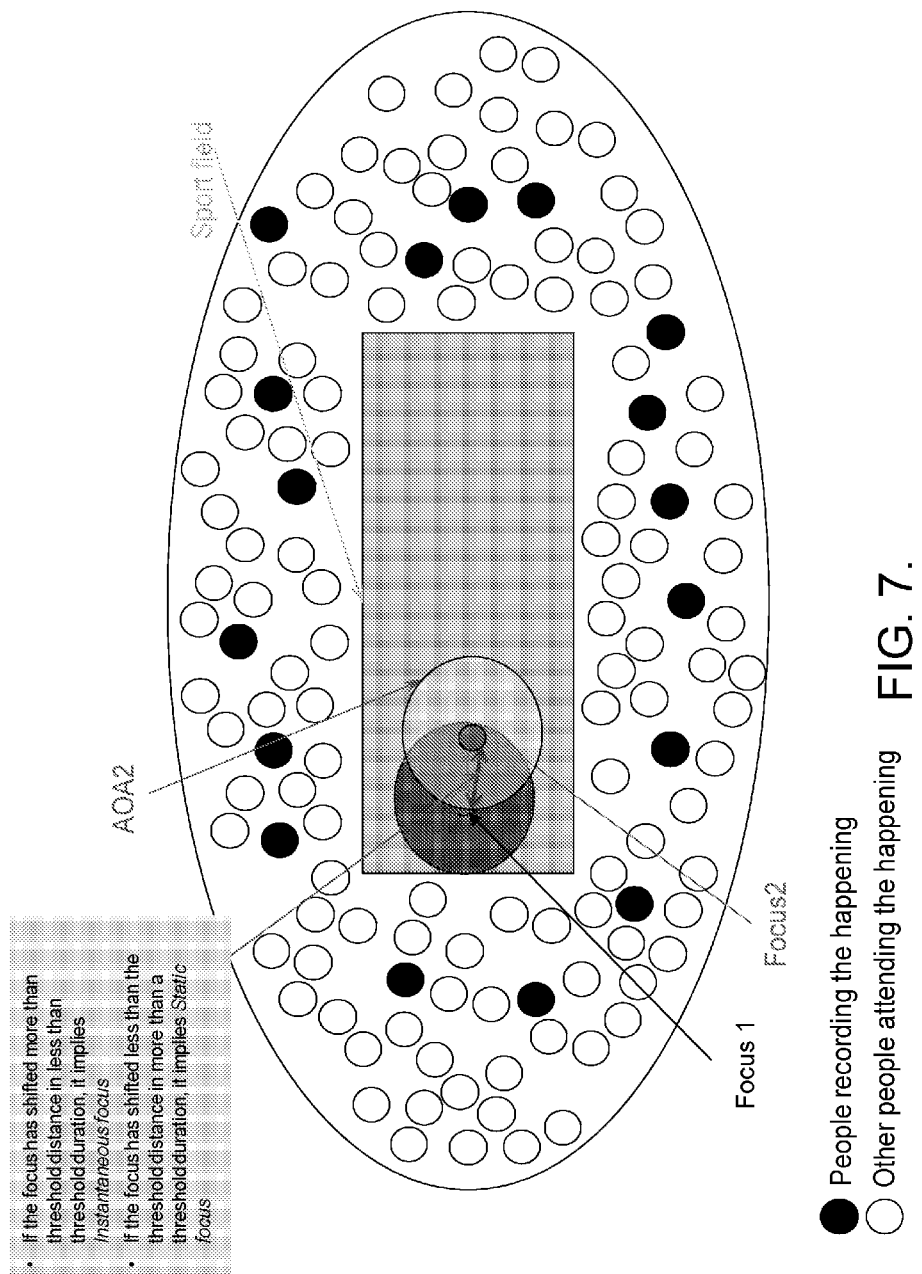
Figure 8:
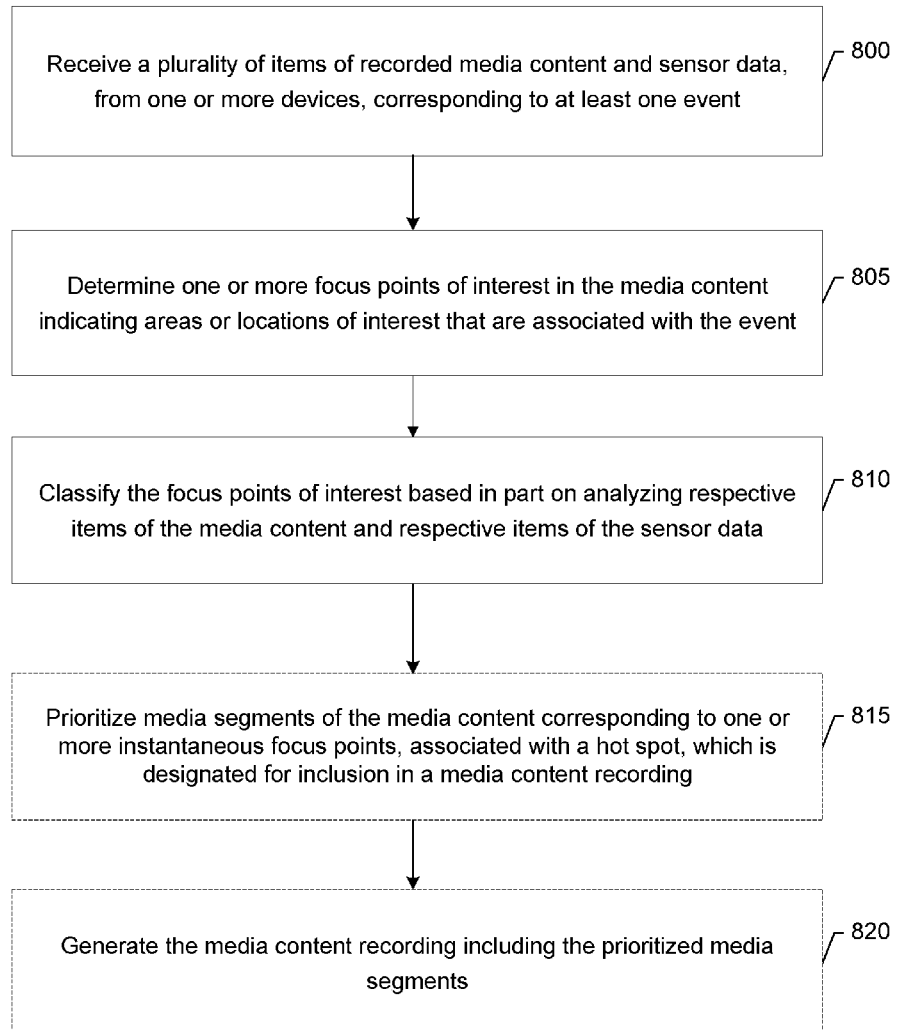
Figure 9:
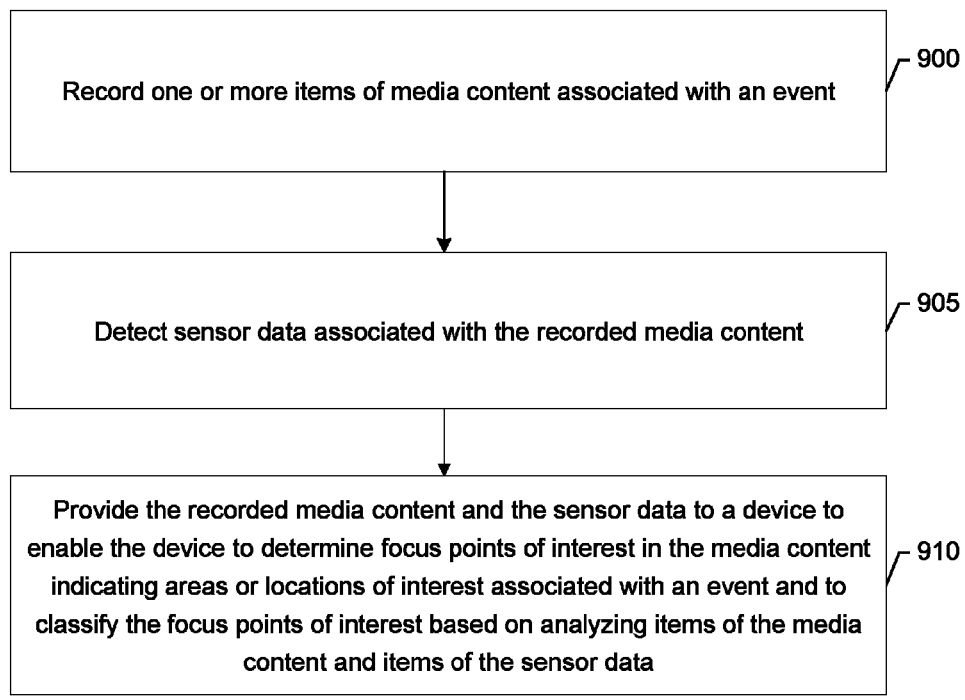

Having thus described the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIG. 3 is a schematic block diagram of a network device according to an example embodiment of the invention;

FIG. 4 is a schematic block diagram of a system according to an example embodiment of the invention;

FIG. 5 is a diagram illustrating a pattern of users utilizing camera modules to record an event in a venue according to an example embodiment of the invention;

FIG. 6 is a diagram illustrating determination of focus points of interest in an instance in which more than a predetermined number of users utilize camera modules to converge on a certain point or area of the event according to an example embodiment of the invention;

FIG. 7 is a diagram illustrating classification of focus points of interest according to an example embodiment of the invention;

FIG. 8 is a flowchart of an example method of enabling classification of focus points detected in media content associated with an event(s) and generation of a media content recording with media segments associated with a portion of the focus points according to an example embodiment of the invention; and FIG. 9 is a flowchart of another example method of enabling classification of focus points detected in media content associated with an event(s) and generation of a media content recording with media segments associated with a portion of the focus points according to an example embodiment of the invention.

DETAILED DESCRIPTION

Some embodiments of the invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a focus point(s) of interest (also referred to herein interchangeably as a focus(es), or a focus point(s))) may denote any part of an event (e.g., a public event), including but not limited to, a field, a stage or the like that is more interesting as compared to the other parts of the event. An event(s) may, but need not, correspond to one or more focus points during the event.

In an example embodiment, a focus point of interest(s) may be determined in an instance in which media capturing devices of multiple users are observed to point on an area(s)

or location(s) in the event. This may be achieved using one or more (or a combination) items of instantaneous sensor data of videos recordings, or images (e.g., pictures) or other media captured during the event. The sensor data may include, but is not limited to, a horizontal orientation detected by a magnetic compass sensor, a vertical orientation detected by an accelerometer sensor, gyroscope sensor data (e.g., for determining roll, pitch, yaw, etc.), location data (e.g., determined by a Global Positioning System (GPS), an indoor position technique, or any other suitable mechanism). Additionally, the sensor data may include any other suitable sensor data.

As referred to herein, a hot-spot(s) may denote an area of interest associated with a number of focus points in a proximity of the area that exceeds a predetermined threshold. In one example embodiment, a hot-spot(s) may be determined based in part on the presence of corresponding instantaneous focus points, associated with an event, in a proximity of the area that exceeds the predetermined threshold.

In some example embodiments, mobile terminals capable of capturing video, audio, images, and detecting locations, as well as connecting to a network may be utilized at one or more public events. The mobile terminals may include a media capturing device (e.g., a camera(s)) and may also include multiple sensors that may be utilized to assist in contextualizing the manner in which a mobile terminal is used. According to an example embodiment, by utilizing network connectivity and sensor information, a mobile terminal may enable user generated content by multiple users at an event to be utilized for various purposes. In this manner, some example embodiments may exploit context recorded information from mobile terminals in order to enrich video content captured by such mobile terminals.

In some example embodiments, multiple users may utilize media capturing devices to record videos, audio and images (e.g., pictures) at one or more events (e.g., a sports event, a music concert, a theater performance, etc.). The recording of the event(s) may be influenced to a great extent by occurrences (also referred to herein as micro-events) that may be of wider interest in the event (e.g., a sports event (e.g., a game), a music event (e.g., a concert) or any other event). For purposes of illustration and not of limitation, these occurrences may correspond to a score such as, for example, a goal in a hockey or soccer game, or an interesting pass of a ball in a football game, a funny act by a performer on a stage in relation to a music event (e.g., a music concert) or any other occurrences that may interest a user during an event. The interesting occurrences may also occur among the audience in addition to on a field or stage. For example, during a football game, users may be interested in viewing/recording in a part of the field where the ball is present, and other occurrences that may be of interest to a user(s) that may happen in other parts of the field or the stadium (e.g., a funny person running into the field, etc.).

In an example embodiment, crowd sourced sensing may be utilized to automatically analyze and determine semantic information about the recording behavior of the users at an event(s). In this regard, the crowd sourced sensing may be obtained by one or more sensors available on a mobile terminal or on dedicated recording devices utilized by users to record videos, audio and/or images (e.g., pictures) or other media (e.g., three-dimensional (3D) video or the like, etc.).

FIG. 1 illustrates a generic system diagram in which a device such as a mobile terminal 10 is shown in an example communication environment. As shown in FIG. 1, an embodiment of a system in accordance with an example embodiment of the invention may include a first communication device (e.g., mobile terminal 10) and a second communication device 20 capable of communication with each other via a network 30. In some cases, an embodiment of the present invention may further include one or more additional communication devices, one of which is depicted in FIG. 1 as a third communication device 25. In one embodiment, not all systems that employ an embodiment of the present invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), tablets, pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the present invention. Furthermore, devices that are not mobile, such as servers and personal computers may also readily employ an embodiment of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all-inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. In one embodiment, the network 30 may be a peer-to-peer (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP), Real-time Transport Protocol (RTP), Session Initiation Protocol (SIP), Real Time Streaming Protocol (RTSP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, Radio Frequency (RF), Near Field Communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal 10 as well as the second and third communication devices 20 and 25 may employ an apparatus (e.g., apparatus of FIG. 2) capable of employing an embodiment of the invention. In one example embodiment, the second communication device 20 may be a network device (e.g., network device 90 of FIG. 3) such as, for example, a server. In this regard, the second communication device 20 may receive recordings (e.g., video data, images, etc.) and sensor data from other devices (e.g., other mobile terminals) and may utilize this information to generate one or more summarized videos or a remix for the complete duration of the available content. The recordings may be captured during an event (e.g., a public event).

FIG. 2 illustrates a schematic block diagram of an apparatus according to an example embodiment. An example embodiment of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 2, the apparatus 50 may include or otherwise be in communication with a processor 70, a user interface 67, a communication interface 74, a memory device 76, a display 85, an orientation module 71, a crowd source sensing module 78, a positioning sensor 72 and a camera module 36. In one example embodiment, the display 85 may be a touch screen display. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, images, videos, audio data, etc.).

The memory device 76 may store geocoded information that may be associated with location information corresponding to coordinates such as, for example, latitude, longitude and/or altitude coordinates of objects (e.g., real world objects). The geocoded information may be evaluated by the processor 70 and/or crowd source sensing module 78 and data associated with the geocoded information may be provided to a camera view of a display (e.g., display 85).

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example. The processor 70 may also be in communication with a display 85 and may instruct the display to illustrate any suitable information, data, content (e.g., media content) or the like.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

The apparatus 50 may include a media capturing element (also referred to herein as a media capturing device), such as camera module 36. The camera module 36 may include a camera, video and/or audio module, in communication with the processor 70 and the display 85. The camera module 36 may be any means for capturing an image, video and/or audio for storage, display or transmission. For example, the camera module 36 may include a digital camera capable of forming a digital image file from a captured image. As such, the camera module 36 may include all hardware, such as a lens or other optical component(s), and software necessary for creating a digital image file from a captured image. Alternatively, the camera module 36 may include only the hardware needed to view an image, while a memory device (e.g., memory device 76) of the apparatus 50 stores instructions for execution by the processor 70 in the form of software necessary to create a digital image file from a captured image.

In an example embodiment, the camera module 36 may further include a processing element such as a co-processor which assists the processor 70 in processing image data and an encoder and/or decoder for compressing and/or decompressing image data. The encoder and/or decoder may encode and/or decode according to a Joint Photographic Experts Group, (JPEG) standard format or other like formats for two-dimensional (2D), three-dimensional (3D) video such as the Motion Picture Experts Group (MPEG) formats. In some cases, the camera module 36 may provide live image data to the display 85. In this regard, the camera module 36 may facilitate or provide a camera view to the display 85 to show live image data, still image data, video data, or any other suitable data. Moreover, in an example embodiment, the display 85 may be located on one side of the apparatus 50 and the camera module 36 may include a lens positioned on the opposite side of the apparatus 50 with respect to the display 85 to enable the camera module 36 to capture images on one side of the apparatus 50 and present a view of such images to the user positioned on the other side of the apparatus 50.

In addition, the apparatus 50 may include a positioning sensor 72. The positioning sensor 72 may include, for example, a global positioning system (GPS) sensor/receiver, an assisted global positioning system (Assisted-GPS) sensor, a Bluetooth (BT)-GPS mouse, other GPS or positioning receivers or the like. However, in one example embodiment, the positioning sensor 72 may include a pedometer or inertial sensor. In this regard, the positioning sensor 72 may be capable of determining a location of the apparatus 50, such as, for example, longitudinal and latitudinal directions of the apparatus 50, or a position relative to a reference point such as a destination or start point. The positioning sensor 72 may also be capable of determining an altitude of the apparatus 50 and use the altitude information in determining the location of the apparatus 50. Information from the positioning sensor 72 may then be communicated to a memory of the apparatus 50 or to another memory device to be stored as a position history or location information.

In an example embodiment, the apparatus 50 may further include (or be in communication with) an orientation module 71. The orientation module 71 may be any means such as a device or circuitry embodied in either hardware or a combination of hardware and software that is configured to determine the orientation of apparatus 50 and/or of the field of view of the camera module 36 of the apparatus 50.

The orientation module 71 may be configured to determine the orientation of apparatus 50 relative to a reference. In some cases, the reference may be a particular direction, such as North or another cardinal direction. However, other references may also be employed. As such, in one embodiment, the orientation module 71 may include a compass or other orientation sensor, such as, for example, a gyroscope, configured to determine the heading of the apparatus 50 or direction that the lens of the camera module 36 is pointing. The direction or heading may be determined in terms of degrees (e.g., 0 to 360 degrees) offset from the reference. In some cases, the reference may be fixed (e.g., a fixed directional reference), while in other cases, the reference may be a reference of opportunity such as a prominent feature in an image captured by the camera module or simply an initial orientation.

In an example embodiment, the orientation of the field of view of the camera module 36 may be compared to the reference in order to determine the current orientation of the apparatus 50. Thus, for example, given an initial image, a particular feature may be selected as the reference. Thereafter, as the field of view is altered, the orientation module 71 may be configured to determine the orientation of the field of view of the camera module 36 based on the speed or amount of movement relative to the reference. While one embodiment may only determine orientation in a single plane (e.g., parallel to the surface of the earth), another embodiment may allow for orientation determination including an elevation aspect and/or axial aspect shifts. Thus, for example, the orientation module 71 may be configured to determine pitch and/or yaw of the apparatus 50 (e.g., pitch defining a degree of elevation and yaw defining an axial rotation). As such, for example, the orientation module 71 may include a device or other means for determining the orientation of the apparatus 50 (or the field of view of the camera module 36), which may be referred to as orientation information. In one embodiment, the orientation module 71 may include an electronic/digital compass, a horizon sensor, gravity sensor, accelerometer, gyroscope, magnetometer and/or the like or any other sensor that may be useful in determining orientation information.

In an example embodiment, the processor 70 may be embodied as, include or otherwise control the crowd source sensing module. The crowd source sensing module 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the crowd source sensing module 78, as described below. Thus, in an example in which software is employed, a device or circuitry (e.g., the processor 70 in one example) executing the software forms the structure associated with such means.

In one example embodiment, the crowd source sensing module 78 may determine instances in which the camera module 36 is pointed at an area or location associated with an event(s) (e.g., a sporting event, a play, a musical or other types of performances or events) of interest to a user to determine one or more focus points of interest related to the event, as described more fully below. The crowd source sensing module 78 may utilize sensor data (e.g., location data, horizontal orientation data, vertical orientation data, field of view data associated with a camera module capturing media content, etc.) obtained from the orientation module 71 and/or the positioning sensor 72 in part to determine areas or locations associated with an event(s) that are of interest to a user.

In one example embodiment, the apparatus 50 may receive media content captured from other apparatuses 50 during an event and sensor data associated with the media content obtained by the other apparatuses during the event. The crowd source sensing module 78 may analyze the media content and the sensor data received from the other apparatuses 50 to determine focus points of interest indicating areas/locations of interest to users during the event. Additionally, in an example embodiment, the crowd source sensing module 78 may combine the media content (e.g., recorded images) captured by the various media capturing devices (e.g., camera modules 36) of the apparatuses 50, such as by mixing the media content (e.g., video recordings) captured by the media capturing devices.

In this regard, the crowd source sensing module 78 may generate a video (e.g., a video summary or remix video) including media segments corresponding to the media content received from the other apparatuses 50.

In another example embodiment, the apparatus 50 may provide media content (e.g., recorded video, recorded images, etc.) that have been captured of an event as well as other related information (e.g., sensor information) to a network device or other image processing device that is configured to store the media content and in some instances to combine the media content captured by the various media capturing devices (e.g., camera modules 36), such as by mixing the media content (e.g., recorded videos, recorded images) captured by the media capturing devices.

Referring now to FIG. 3, a block diagram of one example of a network device is provided. As shown in FIG. 3, the network device (e.g., second communication device 20 (e.g., a server)) generally includes a processor 94 and an associated memory 96. The memory 96 may comprise volatile and/or non-volatile memory, and may store content, data and/or the like. For example, the memory may store content, data, information, and/or the like transmitted from, and/or received by, the network device. In an example embodiment, the memory 96 may store sensor data received from one or more apparatuses 50 and one or more items of media content (e.g., video, audio, images) captured by the one or more apparatuses during one or more events. The sensor data may include, but is not limited, to location information, horizontal orientation information, vertical orientation information, field of view information associated with a media capturing device capturing media data. Also for example, the memory 96 may store client applications, instructions, and/or the like for the processor 94 to perform the various operations of the network device in accordance with an embodiment of the invention, as described herein. The memory 96 may include data associated with media content (e.g., images, videos, audio data, etc.).

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one user input interface 95. The user input interface 95, in turn, may comprise any of a number of devices allowing the network device to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

In an example embodiment, the processor 94 may be embodied as, include or otherwise control the crowd source content manager 97. The crowd source content manager 97 may be any means such as a device or circuitry operating in accordance with software or otherwise embodied in hardware or a combination of hardware and software (e.g., processor 94 operating under software control, the processor 94 embodied as an ASIC or FPGA specifically configured to perform the operations described herein, or a combination thereof) thereby configuring the device or circuitry to perform the corresponding functions of the crowd source content manager 97, as described herein. Thus, in an example in which software is employed, a device or circuitry (e.g., the processor 94 in one example) executing the software forms the structure associated with such means.

The crowd source content manager 97 may analyze recorded media content (e.g., video data, images) received from various communication devices (e.g., apparatuses 50) capturing instances associated with an event(s). In this regard, the crowd source content manager 97 may analyze the media content and other related information such as, for example, sensor data and may determine one or more focus points of interest of the recorded media content associated with the event(s). The focus points of interest may denote areas of interest of a user(s) during an event(s). The crowd source content manager 97 may classify these determined focus points of interest and may utilize the classifications and the recorded media content in part to generate video recordings (e.g., mixed video recordings, video summaries, etc.), as described more fully below.

Referring now to FIG. 4, a diagram of a system according to an example embodiment is provided. The system 7 may include a network device 110 (e.g., network device 90) and one or more communication devices 161, 163, 165, 167 (e.g., apparatuses 50). Although the system 7 of FIG. 4 includes one network device 110, and four communication devices 161, 163, 165, 167, the system 7 may include any suitable number of network devices 110 and communication devices 161, 163, 165, 167 without departing from the spirit and scope of the invention.

In the example embodiment of FIG. 4, a media capturing device (e.g., camera module 36) of communication devices 161, 163, 165, 167 may capture or record media content (e.g., video, images) at an event (e.g., a sports event, a musical event, or any suitable event). Based on the relative location and orientation of each of the communication devices 161, 163, 165, 167, the field of view of may include aspects of the same event. However, although each of the communication devices 161, 163, 165, 167 may capture/record media content of the event, the data (e.g., images) of the media content may be different.

Additionally, one or more sensors of the communication devices 161, 163, 165, 167 may detect context data such as, for example, sensor information associated with the recorded media content. For example, a positioning sensor (e.g., positioning sensor 72) of the communication devices 161, 163, 165, 167 may determine a location of the recorded media content (e.g., location of a field of a stadium, etc.) and an orientation module (e.g., orientation module 71) may determine an orientation (e.g., a horizontal orientation, a vertical orientation) and position (e.g., a field of view (also referred to herein as angle of view)) of a media capturing device (e.g., camera module) capturing the recorded media content. The context data (e.g., sensor information) and the recorded media content associated with the event(s) may be provided by the communication devices 161, 163, 165, 167 to the network device 110. In an example embodiment, the communication devices 161, 163, 165, 167 may send the sensor information and the recorded media content to the network device 110 in real-time upon detection of the sensor information and the recorded media content, or at a later time, or in any other suitable manner. For example, the sensor information may be sent by the communication devices 161, 163, 165, 167 to the network device 110 in real time, but the recorded media content may be sent by the communication devices 161, 163, 165, 167 to the network device 110 at a later time.

In this regard, a crowd source content manager (e.g., crowd source content manager 97) of the network device 110 may receive the recorded media content and the context data, such as for example, the sensor information and may analyze this information to determine focus points of interest associated with the recorded media content of the event(s) and may classify the focus points of interest. Additionally, the crowd source content manager of the network device 110 may use the classifications of the focus points of interest in part to generate one or more videos (e.g., a mixed video, a summary video) that may include one or more portions of the recorded media content received from the communication devices 161, 163, 165, 167. In other words, the classifications of the focus points may be utilized to determine sematic information for recorded media content, which may be utilized to automatically generating one or more videos (e.g., a summary video), as described more fully below. The videos generated by the network device 110 may be provided to one or more of the communication devices 161, 163, 165, 167.

Referring now to FIG. 5, an event that may be attended by a number of people is generally illustrated. While the event depicted in FIG. 5, is a sporting event, the sporting event (e.g., a football game in a stadium) of FIG. 5 is for purposes of example, the example embodiments may also be utilized in conjunction with a number of different types of events including but not limited to theater performances, musicals, plays, or any other types of events. Regardless of the type of event, a plurality of people may attend the event. As shown in FIG. 5, a number of people who attend the event may each have user equipment, such as an apparatus 50, for capturing images, such as video images, of at least a portion of the event.

With respect to the example depicted in FIG. 5, the people recording the happening may have apparatuses 50 configured to capture a plurality of images such as, for example, a video recording of at least a portion of the event. Additionally, in the example embodiment of FIG. 5, the media capturing devices (e.g., camera modules 36) of the apparatuses 50 may capture images, such as video recordings, of the sport field 5. The media capturing devices of the apparatuses 50 may capture the images of the sport field 5 at different orientations and positions. Some of the captured images may relate to different areas of the sport field 5. However, in other example embodiments, the media capturing devices of the apparatuses 50 may capture images of other areas (e.g., the audience in the stands) of the stadium 3.

In another example embodiment, in an instance in which the crowd source content manager 97 detects that more than a certain threshold number of users pointed a media capturing device (e.g., camera module 36) of communication devices (e.g., communication device 161, 163, 165, 167) on a certain area or location (e.g., an area smaller than a predefined threshold area (e.g., radius), then the crowd source content manager 97 may determine that the corresponding area is a focus point(s) of interest. A focus point(s) of interest may be a portion(s) of the event that is of more interest to a user as compared to other portions of the event. The crowd source content manager 97 may determine instances in which media capturing devices point at an area/location corresponding to an event based in part on analyzing the sensor information (e.g., location information, horizontal orientation and vertical orientation information, and/or field of view information) associated with the recorded media content (e.g., recorded images of the event). As such, an area/location of interest (associated with an event) to more than a threshold number of users may be classified by the crowd source content manager 97 as a focus point. This threshold number may be defined as a fraction percentage of the total number of users detected at the event or a numeric value. An event(s) may be associated with multiple simultaneous focus points.

The crowd source content manager 97 may classify focus points detected and occurring during one or more events. The crowd source content manager 97 may classify a determined focus point(s) of interest as an instantaneous focus (also referred to herein as instantaneous focus point(s) of interest) based in part on analyzing the sensor information (e.g., location information, horizontal orientation, vertical orientation information, and/or position information (e.g., field of view information) associated with a media capturing device capturing media content, etc.) and detecting an instance in which a center of the determined focus point(s) of interest stays/remains within a certain area (e.g., a radius) (e.g., an area (radius) less than a pre-defined threshold area (e.g., radius)) for less than a certain duration (e.g., less than a predefined threshold duration). As such, in one example embodiment, an instantaneous focus point(s) may be associated with an instance in which a user points a media capturing device at an area of interest for a relatively short duration. In other words, a focus point may be classified as an instantaneous focus point in an instance in which the temporal movement of the focus point is outside the threshold area (e.g., radius) in less than the threshold duration.

On the other hand, the crowd source content manager 97 may classify a determined focus point(s) of interest as a static focus (also referred to herein as a static focus point(s) of interest) based in part on analyzing the sensor information and detecting an instance in which a center of the determined focus point(s) of interest stays within a certain area (e.g., radius) (e.g., an area (e.g., radius) less than a pre-defined threshold area (radius)) for more than a certain duration (e.g., more than a pre-defined threshold duration). As such, in one example embodiment, a static focus point(s) may be associated with an instance in which a user points a media capturing device at an area of interest for a duration that is longer than a predetermined threshold duration. In other words, a focus point may be classified by the crowd source content manager 97 as a static focus point in an instance in which a temporal movement of the focus point is within a threshold area (e.g., radius) for a duration greater than the threshold period.

In an alternative example embodiment, the crowd source content manager 97 may determine a static focus by temporally combining determined instantaneous focuses (e.g., which may not necessarily be temporally adjacent) whose centers stay/remains within a certain areas (e.g., radius) and where the overall temporal extent (e.g., obtained by summing up the durations of the single instantaneous focuses) is more than a predefined threshold duration.

In one example embodiment, the crowd source content manager 97 may classify a determined focus point(s) of interest as a new focus based in part on analyzing the sensor information and detecting an instance in which the center of the determined focus point(s) of interest shifts more than a certain area (e.g., radius) (e.g., more than a predefined threshold area (e.g., radius).

Referring now to FIG. 6, a diagram illustrating a determined focus point of interest is provided according to an example embodiment. In the example embodiment of FIG. 6, the crowd source content manager 97 may detect a focus point of interest 11, in an instance in which the crowd source content manager 97 determines that a certain number of users exceeding a threshold number of users utilized media capturing devices of apparatuses 50 to capture/record media content (e.g., record video) at a certain area 9 (also referred to herein as area of attraction (AOA) 9) that is smaller than a predefined threshold area (e.g., radius) during an event (e.g., a sport event, musical event, etc.). The area of attraction 9 may be an area around the focus 11 determined by a predefined shape of predefined dimensions. The shape and dimensions may be specific to a particular type of event, for example. As such, although FIG. 6 depicts an area of attraction 9 having a circular area of a certain radius centered around the focus 11, shapes other than a circle may be utilized, including but not limited to, a square, a rectangle, an ellipse, etc.

Referring now to FIG. 7, a diagram illustrating classification of a focus is provided according to an example embodiment. In the example embodiment of FIG. 7, the crowd source content manager 97 may classify a focus 1 as an instantaneous focus in an instance in which the crowd source content manager 97 detects that focus 1 has shifted more than a threshold distance in less than a threshold duration. On the other hand, the crowd source content manager 97 may classify focus 1 as a static focus in an instance in which the crowd source content manager 97 detects that the focus 1 has shifted less than the threshold distance in more than a threshold duration.

Additionally, the crowd source content manager 97 may classify a focus point as a new focus (e.g., focus 2) in an instance in which the crowd source content manager 97 detects that a focus point (e.g., focus 1) is shifted such that it is located outside of a threshold area (e.g., radius) distance of an existing focus point (e.g., focus point 1).

In an example embodiment, the threshold duration (e.g., a temporal duration) and/or the threshold distance (e.g., a threshold radius) utilized by the crowd source content manager 97 for classification of a focus point may be based in part on the type of event. For example, the crowd source content manager 97 may determine that the threshold distance for classifying a static threshold may be different for a tennis event as compared to a football event (which is relative to the size of the event area). Additionally, the threshold duration may depend on the pace of a type of event (e.g., game). For example, the crowd source content manager 97 may determine that a focus point for a golf game may be stable for a longer duration since the pace of the golf game is slower as compared to a focus point corresponding to a football game in which the pace of the game is faster.

Additionally, in one example embodiment, the threshold number of users for new focuses may be based in part on the type of event. For purposes of illustration and not of limitation, in exhibition type of events (e.g., exhibition games (e.g., an exhibition basketball game, etc.)) there may be multiple focus points and the number of users may be moderate. As such, the threshold number of users for a determining a focus in exhibition type of events may be kept moderate by the crowd source content manager 97. In other types of events, for example, a festival or game with big crowds, the threshold number of users for detecting/determining a focus point of interest may be set by the crowd source content manager 97 to be different (e.g., a different value) since for an event that has 100,000 persons, a focus point(s) of interest is likely to have a larger number of users than in example of an exhibition type of event where a few tens or couple of hundred persons may attend the event. In this regard, the total number of unique users may be used as a basis by the crowd source content manager 97 to determine the actual threshold numbers. For post processing of received recorded media content, the crowd source content manager 97 may determine that the total number of users who recorded at the event relates to a sum of unique recording devices (e.g., media capturing devices (e.g., camera modules 36)).

In an example embodiment, the crowd source content manager 97 may update the thresholds (e.g., a threshold number of users for detecting a focus point, a threshold distance and/or a threshold duration for classifying focus points) in real time based on the information being received regarding an event. The information may include, but is not limited to, a detection of a type of event, the total number people estimated to attend the event (e.g., 100,000 people for a soccer game) and the total number of people (e.g., 5,000 people) utilizing the apparatuses (e.g., apparatuses 50) to communicate recorded media data (e.g., recorded video) to a crowd source content manager 97 of a network device (e.g., network device 90).

In one example embodiment, the crowd source content manager 97 may track the total number of users that have been initially detected (e.g., at the start of an event (e.g., a game)) as providing recorded media content to the crowd source content manager 97 until the point in time when a focus detection operation is performed. For example, the total number of users that have recorded media content during the first 10 minutes of the event may be less than the total number of users that have recorded media content during the first 40 minutes of the event. As such, the instantaneous value of the total number of users may be weighted based on the elapsed time detected since the start of a detection of a first received recording of media content from an apparatus (e.g., apparatus 50). In an instance in which the type of event is detected by the crowd source content manager 97, the crowd source content manager 97 may determine/estimate the duration of the event. For example, in an instance in which the event corresponds to a game (e.g., a football game), a concert or the like, the crowd source content manager 97 may estimate the event duration based in part on historical data indicating durations for a game, a concert, etc. of the same type of event. The expected duration of the event may be used, by the crowd source content manager 97 to estimate the total number of users. This estimation may be based in part on a suitable distribution to determine the total number of users that record at the event. In an instance in which the distribution of arrival is uniform, then the total number of users detected in interval T1 is N1 for an event of expected duration D. The total number of users may be estimated, by the crowd source content manager 97, at N1*(D/T1). Alternatively, a user detection distribution integrated over the interval of the event duration may be used to estimate the total number of users.

In another example embodiment, the threshold for detecting a focus point of interest may be determined, by the crown source content manager 97 based in part on using a fraction of a maximum focus size. The maximum focus size may be a focus point that has a maximum number of users. For example, for an event that has a maximum focus size comprising of 20 users, the crowd source content manager 97 may define a threshold which is 25% or more, implying a detected focus point of interest should consist of at least 5 users.

As described above, the classification of focus points of interest may be utilized by the crowd source content manager 97 in part to generate one or more videos. In an example embodiment, the crowd source content manager 97 may receive recorded media content (e.g., recorded video, recorded images), associated with an event(s), from apparatuses 50 and may utilize this received media content to mix the media content to generate one or more video summaries or full duration videos made from multiple video sources (both are also referred to herein as video remixes).

In this regard, the classification of the focus points may be used subsequently for determination of semantic information for the recorded media content. In an event(s) such as, for example, a sports event (e.g., football), parts of the field where most of the crowd is following the ball may be determined by the crowd source content manager 97 to be more interesting for determining one or more interesting occurrences in the game (e.g., football game). This behavior may be utilized by the crowd source content manager 97 to track the movement of the ball in the game as well as any hot-spots that occur during the event (e.g., the football game). This fact can be leveraged to generate video remixes from multiple media content of users for sports events. For example, one or more focuses classified as instantaneous focuses in the sport event may be leveraged/utilized by the crowd source content manager 97 to achieve crowd-sourced ball-tracking. The detection of focus points associated with recorded media content received from apparatuses 50 being classified as instantaneous focuses may be prioritized by the crowd source content manager 97 based on the number of users for each individual focus or a percentage of users for each individual focus in an instance in which multiple focus points may be detected by the crowd source content manager 97 identified in the event. In one example embodiment, the crowd source content manager 97 may utilize focus points designated/classified as instantaneous focuses to generate a video recording that uses video segments associated with these instantaneous focus points for inclusion in the generated video recording (e.g., a summary video). In this regard, the crowd source content manager 97 may include the interesting occurrences (e.g., scored points) of a game in the generated video recording. It should be pointed out that the above example related to an event such as a sport event for purposes of illustration and not of limitation. As such, the example embodiments may also be utilized in conjunction with a number of other different types of events including, but not limited to, musicals, plays or other events without departing from the spirit and scope of the invention.

In one example embodiment, the total number of users who have utilized apparatuses 50 to record media content in the event may be designated, via the crowd source content manager 97, by a value such as K. In another example embodiment, in addition to utilizing instantaneous focuses for generating a video recording, at a time T1, in an instance in which a number of users recording at the event is greater than a threshold value (e.g., specified by a predefined fraction of K), a video segment(s) during that interval may be labeled by the crowd source content manager 97 as salient. The crowd source content manager 97 may include video segments received by apparatus 50 of users that are designated as salient in a generated video recording (e.g., a summary video). Additionally, consideration, by the crowd source content manager 97, of a parameter (also referred to herein as a simultaneous users parameter) identifying simultaneous users (users capturing media content for an event at the same time) may ensure that the most popular parts of the event are included (e.g., since the crowd source content manager 97 may observe that the popular segments of the event also tend to have more apparatuses 50 of users recording these segments) in a video generated by the crowd source content manager 97. In determining simultaneous users, the crowd source content manager 97 may not necessarily analyze any captured data (e.g., video, audio, compass data, etc.). Instead, the crowd source content manager 97 may consider the time when a user utilizes an apparatus 50 to start and stop recording of media content associated with an event.

In one example embodiment, a position of a goal determined based in part on analyzing the distribution of users recording at an event, may be used by the crowd source content manager 97 to classify the focus points that fall within a certain area (e.g., radius) of the position of a goal. The video segments corresponding to these focus points may be used for determination of high-priority video segments. These high-priority video segments may be used for generating high relevance crowd-sourced remixes or crowd-sourced summary remixes (e.g., video remixes) of a corresponding game (e.g., a football game). Similar to the goal in football matches, other similar types of hot-spots in other sports (e.g., a batter's box in a baseball game, a hockey goal in a hockey game, etc.) may be considered for classifying corresponding focus points that fall within an area (e.g., radius) of the hot-spots as high-priority video segments for inclusion in a summary remix video.

In another example embodiment, the sensor data may be received from one or more apparatuses 50 by a network device (e.g., network device 110) in real-time. This sensor data may indicate one or more hot-spots to the network device. In this regard, the crowd source content manager of the network device (e.g., network device 110) may to provide one or more alerts to apparatuses 50 of users (e.g., even apparatuses 50 of users that are not currently recording media content) participating in a service (e.g., a crowd source sensing service) in which the alerts may indicate hot-spot(s) in an instance in which a focus point(s) is detected to be near or in the vicinity of a hot-spot (e.g., a goal). The alerts may correspond to a message or may include a recommendation to the users of the apparatuses 50 to re-target media capturing devices (e.g., camera modules 36) to an identified hot-spot(s) in the event that a corresponding media capturing device is being pointed away from the hot-spot(s) by more than a predetermined threshold value.

In another example embodiment, the crowd source content manager 97 may enable annotation of received video segments that may enable prioritizing of certain video segments above others to optimize a generated crowd-source remix (e.g., a sports video remix). Regarding events such as, for example, sport events including but not limited to football and/or basketball games, crowd-sourced annotation information may be generated based on two hot-spots on the opposite sides of a field/court (e.g., the goals and the baskets) and the layout of the users that are registered with the service (e.g., a crowd source service) may be determined by the crowd manager 97 based in part on using the location distribution of the users in the event. This layout information may be used by the crowd source content manager 97 to determine the major and minor axis of an event field (e.g., a sports field (e.g., sport field 5)). In this regard, the crowd source content manager 97 may determine the orientation of the field. The orientation of the field and the internal envelope of the user positions at the event may be used by the crowd source content manager 97 to determine the positions of the hot-spots (e.g., goal posts).

As described above, the context data (e.g., location information, horizontal and vertical orientation information, field of view information of a media capturing device, etc.) from the users recording at an event may be used by a crowd source content manager 97 to determine one or more focus points of the event and to classify the focus points as instantaneous, static or new. The instantaneous focus points may be utilized in part by the crowd source content manager 97 to determine the presence of one or more hot-spots in the event. For example, the crowd source content manager 97 may designate an area associated with an event as a hot spot in an instance in which a number of instantaneous focus points, are within a proximity of the area, and exceed a predetermined threshold.

In an instance in which a match or game is in progress, the focus points may track/follow the ball or something out-of-the-ordinary in the event area. As such, the video segments that may be associated with these focus points may be used by the crowd source content manager 97 to automatically generate one or more video remixes of the event (e.g., a sports event).

The video segments recorded by the users that are following the focus points which are within a threshold radius from the estimated position of a hot-spot(s) (e.g., position of a goal) may be rated higher than other focus points, since they may have a higher probability of capturing the hot-spot(s) (e.g., goal posts).

By combining the crowd-sourced focus tracking and media analysis, the crowd source content manager 97 may generate higher level information such as, for example, presence of a scored goal in a video segment(s) (e.g., by means of audio content analysis, where salient audio segments may be discovered, for example, by detecting audio segments with high energy levels).

Other items of information associated with an event(s) may be detected by the crowd source content manager 97. This other information may include, but is not limited to, one or more breaks in the event(s) (e.g., a game). The breaks may relate to disappearance of focus points, re-orientation of focus points towards a particular direction, or any other suitable breaks. Additionally, this other information may include, but is not limited to, ball possession percentage to suggest domination of one side over the other side (e.g., presence of a focus point(s) in one half of the field) or any other suitable information.

In one example embodiment, the crowd source sensing module 78 may perform features analogous to the crowd source content manager 97 in instances in which communication devices (e.g., communication devices 161, 163, 165, 167) capture media content associated with an event and provide the captured media content to the crowd source sensing module 78. As such the crowd source sensing module 78 may determine one or more focus points, classify the focus points and utilize media segments associated with at least some of the focus points to generate a media content recording (e.g., a remix video recording, a summary video recording, etc.) The generated media content recording may be provided to one or more communication devices.

Referring now to FIG. 8, an example embodiment of a flowchart for enabling classification of focus points detected in media content associated with an event(s) and generation of a media content recording with media segments associated with a portion of the focus points is provided. At operation 800, an apparatus (e.g., network device 110 (e.g., network device 90)) may receive a plurality of items of recorded media content and sensor data, from one or more devices (e.g., communication devices 161, 163, 165, 167 (e.g., apparatuses 50), corresponding to at least one event. At operation 805, an apparatus (e.g., network device 110) may determine one or more focus points of interest in the media content indicating areas or locations of interest that are associated with the event. At operation 810, an apparatus (e.g., network device 110)

may classify the focus points of interest based in part on analyzing respective items of the media content and respective items of the sensor data. Optionally, at operation 815, an apparatus (e.g., network device 110) may prioritize media segments (e.g., video segments) of the media content corresponding to one or more instantaneous focus points, associated with a hot-spot, that is designated for inclusion in a media content recording. Optionally, at operation 820, an apparatus (e.g., network device 110) may generate the media content recording including the prioritized media segments (e.g., a remix video, a summary video, etc.).

Referring now to FIG. 9, an example embodiment of a flowchart for enabling classification of focus points detected in media content associated with an event(s) and generation of a media content recording with media segments associated with a portion of the focus points is provided. At operation 900, an apparatus (e.g., an apparatus 50) may record one or more items of media content associated with an event. At operation 905, an apparatus (e.g., apparatus 50) may detect sensor data associated with the recorded media content. The sensor data may include, but is not limited to, location information, orientation information, and/or position information of a media capturing device (e.g., camera module 36).

At operation 910, an apparatus (e.g., an apparatus 50) may provide the recorded media content and the sensor data to a device (e.g., network device 90 (e.g., network device 110)) to enable the device to determine focus points of interest in the media content indicating areas or locations of interest that are associated with the event and to classify the focus points of interest based in part on analyzing items of the media content and items of the sensor data.

It should be pointed out that FIGS. 8 and 9 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76, memory 96) and executed by a processor (e.g., processor 70, processor 94, crowd source sensing module 78, crowd source content manager 97, a co-processor of camera module 36). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the method of FIGS. 8 and 9 above may comprise a processor (e.g., the processor 70, processor 94, the crowd source sensing module 78, the crowd source content manager 97, the co-processor of camera module 36) configured to perform some or each of the operations (800-820, 900-910) described above. The processor may, for example, be configured to perform the operations (800-820, 900-910) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (800-820, 900-910) may comprise, for example, the processor 70 (e.g., as means for performing any of the operations described above), the processor 94, the crowd source sensing module 78, the crowd source content manager 97, the co-processor of the camera module 36 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:

receiving a plurality of items of recorded media content and sensor data, from one or more respective recording devices, corresponding to at least one event, wherein the recorded media content and the sensor data are captured by the respective recording devices;

determining, via a processor, one or more focus points of interest in the recorded media content indicating areas or locations of interest that are associated with the event by determining that a number of the recording devices capturing the media content exceeds a predefined threshold; and classifying the focus points of interest based in part on analyzing respective items of the sensor data and by classifying one or more of the focus points as static focus points in response to determining that a center of the focus points remains within a predetermined threshold area for a time period that exceeds a predetermined threshold duration.

2. The method of claim 1, wherein determining the focus points of interest further comprises determining that the recording devices are pointed to at least one of the areas that comprises an area smaller than a predetermined threshold.

3. The method of claim 1, wherein classifying the focus points of interest further comprises classifying a subset of the focus points of interest as instantaneous focus points of interest in response to determining that a center of the subset of the focus points of interest remains within a predetermined threshold area for a time period less than a predetermined threshold duration.

4. The method of claim 1, wherein classifying the focus points further comprises classifying at least one of the focus points as a new focus point in response to determining that a center of the focus point is shifted more than a predetermined threshold distance.

5. The method of claim 3, further comprising:
designating an area of the event as a hot spot in response to determining a number of the subset of the instantaneous focus points or the static focus points, within a proximity of the area, exceeds a predetermined threshold.

6. The method of claim 5, further comprising:
prioritizing media segments of the media content corresponding to the subset of the instantaneous focus points or the static focus points, associated with the hot spot, that are designated for inclusion in a media content recording.

7. The method of claim 6, further comprising:
combining the prioritized media segments; and
generating the media content recording comprising the combined media segments.

8. The method of claim 1, wherein the sensor data comprises at least one of location information corresponding to the event, orientation information indicating an orientation, in a vertical or horizontal plane, of the recording devices, capturing the media content, or information indicating a position of the recording devices while capturing the media content.

9. An apparatus comprising:
at least one processor; and
at least one memory including computer program code, the at least one memory and the computer program code configured to, with the at least one processor, cause the apparatus to perform at least the following:
receive a plurality of items of recorded media content and sensor data, from one or more recording devices, corresponding to at least one event, wherein the recorded media content and the sensor data are captured by the respective recording devices;
determine one or more focus points of interest in the recorded media content indicating areas or locations of interest that are associated with the event by determining that a number of the recording devices capturing the media content exceeds a predefined threshold; and
classify the focus points of interest based in part on analyzing respective items of the sensor data and by classifying one or more of the focus points as static focus points in response to determining that a center of the focus points remains within a predetermined threshold area for a time period that exceeds a predetermined threshold duration.

10. The apparatus of claim 9, wherein the at least one memory and the computer program code are further configured to, with the processor, cause the apparatus to:
determine the focus points of interest by determining that the recording devices are pointed to at least one of the areas that comprises an area smaller than a predetermined threshold.

11. The apparatus of claim 9, wherein the at least one memory and the computer program code are further configured to, with the processor, cause the apparatus to:
classify the focus points of interest by classifying a subset of the focus points of interest as instantaneous focus points of interest in response to determining that a center of the subset of the focus points of interest remains within a predetermined threshold area for a time period less than a predetermined threshold duration.

12. The apparatus of claim 9, wherein the at least one memory and the computer program code are further configured to, with the processor, cause the apparatus to:
classify the focus points further comprises classifying at least one of the focus points as a new focus point in response to determining that a center of the focus point is shifted more than a predetermined threshold distance.

13. The apparatus of claim 11, wherein the at least one memory and the computer program code are further configured to, with the processor, cause the apparatus to:
designate an area of the event as a hot spot in response to determining a number of the subset of the instantaneous focus points or the static focus points, within a proximity of the area, exceeds a predetermined threshold.

14. The apparatus of claim 13, wherein the at least one memory and the computer program code are further configured to, with the processor, cause the apparatus to:
prioritize media segments of the media content corresponding to the subset of the instantaneous focus points or the static focus points, associated with the hot spot, that are designated for inclusion in a media content recording.

15. The apparatus of claim 14, wherein the at least one memory and the computer program code are further configured to, with the processor, cause the apparatus to:
combine the prioritized media segments; and
generate the media content recording comprising the combined media segments.

16. The apparatus of claim 9, wherein the sensor data comprises at least one of location information corresponding to the event, orientation information indicating an orientation, in a vertical or horizontal plane, of the recording devices, capturing the media content, or information indicating a position of the recording devices while capturing the media content.

17. A method comprising:
recording, via a communication device, one or more items of media content associated with an event;
detecting, via a processor of the communication device, sensor data associated with the recorded media content; and
enabling provision of the recorded media content and the sensor data to a device to enable the device to determine one or more focus points of interest in the media content indicating areas or locations of interest that are associated with the event by determining that a number of recording devices capturing the recorded media content exceeds a predefined threshold and to classify the focus points of interest based in part on analyzing respective items of the sensor data and by classifying one or more of the focus points as static focus points in response to determining that a center of the focus points remains within a predetermined threshold area for a time period that exceeds a predetermined threshold duration.

18. The method of claim 17, further comprising:

receiving an indication of a hot-spot corresponding to a designated area of the event in response to a determination that a number of instantaneous focus points, within a proximity of the area, exceeds a predetermined threshold, the instantaneous focus points are detected in response to determining that a center of a subset of the focus points of interest remains within the predetermined threshold area for a time period less than the predetermined threshold duration.

* * * * *